United States Patent [19]

Olson et al.

[11] Patent Number: 5,729,886
[45] Date of Patent: Mar. 24, 1998

[54] METHOD OF MODIFYING AN ALTERNATOR

[76] Inventors: Stanley L. Olson, 48045 280th St., Canton, S. Dak. 57013; Kelvin J. Hanssen, 4131 Williamsburg Ct., Sioux Falls, S. Dak. 57103

[21] Appl. No.: 674,764

[22] Filed: Jul. 2, 1996

[51] Int. Cl.[6] .................................................. H02K 15/14
[52] U.S. Cl. ........................ 29/598; 29/401.1; 29/402.06; 310/91
[58] Field of Search .................... 29/598, 401.1, 29/402.03, 402.04, 402.05, 402.06; 310/91

[56] References Cited

U.S. PATENT DOCUMENTS

| | | | |
|---|---|---|---|
| 4,469,966 | 9/1984 | Iwaki et al. | 310/62 |
| 4,506,179 | 3/1985 | Chernoff et al. | 310/91 |
| 4,631,469 | 12/1986 | Tsuboi et al. | 322/42 |
| 4,666,122 | 5/1987 | Goodard | 248/666 |
| 4,697,782 | 10/1987 | Ban | 248/639 |
| 4,908,540 | 3/1990 | Motodate et al. | 310/240 |
| 4,945,271 | 7/1990 | Yokoya et al. | 310/91 |
| 4,945,272 | 7/1990 | Ochi et al. | 310/91 |
| 5,172,022 | 12/1992 | Ketola | 310/91 |

*Primary Examiner*—Carl E. Hall
*Attorney, Agent, or Firm*—Zarley, McKee, Thomte, Voorhees & Sease; Dennis L. Thomte

[57] ABSTRACT

A method of modifying an alternator so that it may replace a generator on an older model motorcycle. The steps are: (a) removing the dog or dogs from the alternator housing; (b) removing the belt pulley from the rotor shaft; (c) removing the alternator nose housing from the alternator tail housing; (d) shortening the rotor shaft; (e) mounting a shaft adapter on the rotor shaft stub; (f) securing the alternator nose housing to the alternator tail housing; (g) securing an adapter plate to the outer end of the alternator nose housing; and (h) mounting a gear wheel on the adapter shaft.

10 Claims, 5 Drawing Sheets

METHOD OF MODIFYING AN ALTERNATOR

BACKGROUND OF THE INVENTION

1. Field of the Invention

This invention relates to a method of modifying an alternator and more particularly to a method of modifying an alternator to enable the modified alternator to replace the generator on a motorcycle. In accordance with the method of modifying the alternator, an adapter kit may be provided to enable the modified alternator to replace the generator on a motorcycle.

2. Description of the Related Art

Some older Harley-Davidson motorcycles, such as the pre-1982 XL models and the pre-1969 FL models, utilize 6 or 12-volt generators together with a voltage regulator. The generators and regulators often require replacement. Further, generators utilized on the older Harley-Davidson models were not very efficient, since, at low RPM's, the generator would discharge.

SUMMARY OF THE INVENTION

A method of modifying an alternator to enable the modified alternator to replace the generator on a motorcycle is described. An automotive alternator is first purchased and the mounting or tightening lugs thereon are removed. The pulley nut and pulley are then removed from the rotor shaft. The nose housing of the alternator is then removed from the alternator and the outer end thereof is machined to fit an adapter plate to be mounted thereon. The rotor shaft bearing in the nose housing is then removed. The rotor shaft is then cut back approximately one inch to remove the threaded portion thereon. An adapter shaft is then secured to the stub of the rotor shaft. Adapter plate mounting bolts are extended outwardly through the nose housing and an adapter plate is secured to the nose housing. The nose housing is then reassembled on the alternator. When the nose housing having the adapter plate mounted thereon is reassembled to the alternator, the adapter shaft extends outwardly through a central opening formed in the adapter plate. The adapter shaft is rotatably supported in the adapter plate by a double-sealed bearing which is maintained therein by at least one snap ring. An oil slinger is positioned on the outer end of the adapter shaft outwardly of the adapter plate. The original drive gear from the generator being replaced is mounted on the outer end of the adapter shaft and is maintained thereon by a washer and nut. The modified alternator is mounted on the motorcycle by inserting the drive gear into the opening formed in the support plate which formerly supported the generator so that the drive gear meshes with the drive gear in the support plate. The alternator is then wired to the battery, switch and coil, as well as to other accessories.

It is therefore a principal object of the invention to provide a method of modifying an alternator so that it may replace a generator on a motorcycle.

Still another object of the invention is to provide a method of modifying an alternator which entails the modification of a conventional automotive alternator so that it may be adapted to replace a generator on a motorcycle.

Still another object of the invention is to provide an alternator to enable the conversion of a motorcycle from a generator-type motorcycle to an alternator-type motorcycle.

Still another object of the invention is to provide a method of modifying an alternator which is economical.

These and other objects will be apparent to those skilled in the art.

DESCRIPTION OF THE PREFERRED EMBODIMENT

Figure 1:
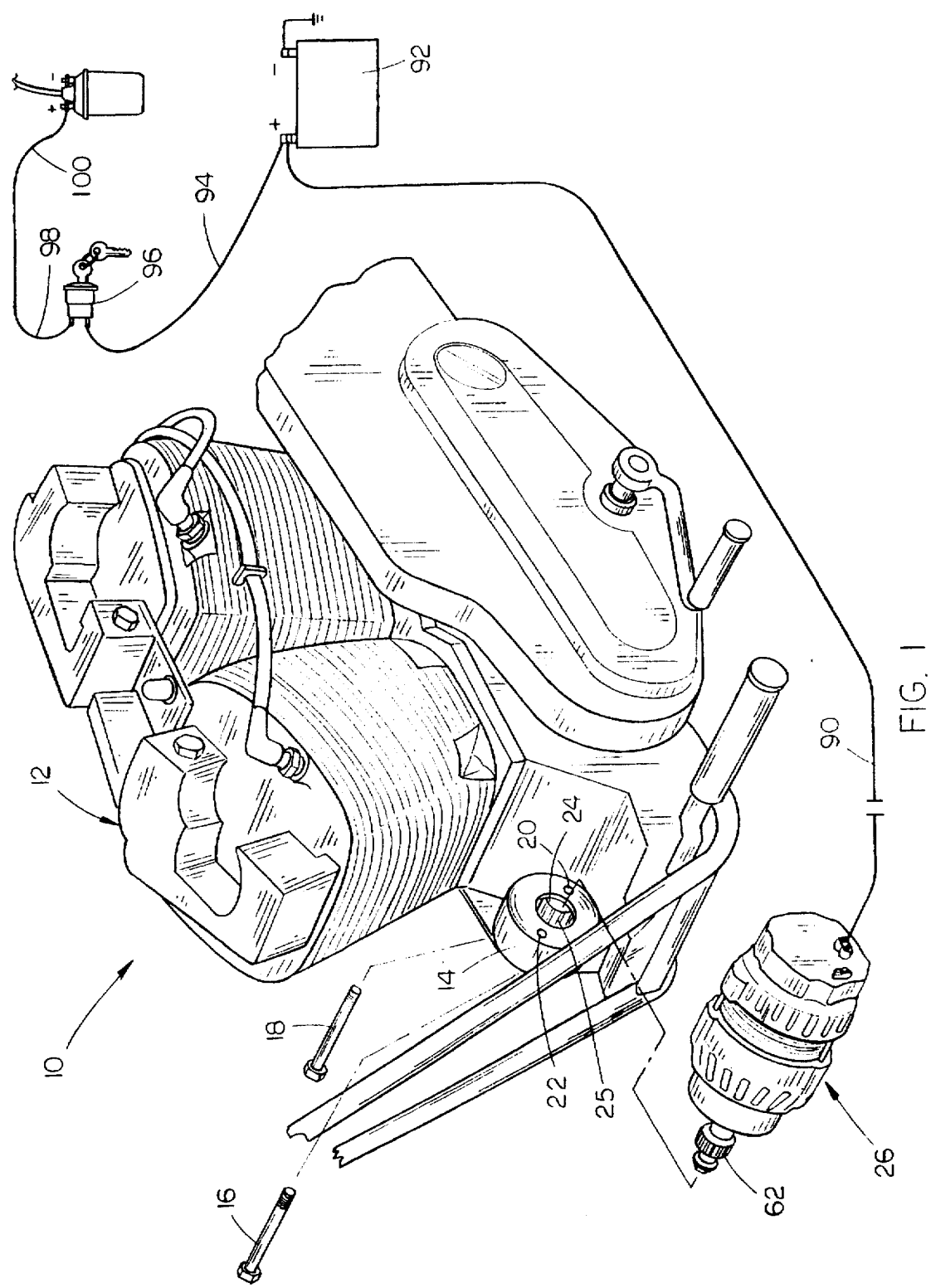
FIG. 1 is a perspective view of a portion of a motorcycle illustrating the relationship of the motorcycle and the modified alternator to be mounted thereon in place of the generator formerly utilized thereon.

FIG. 1 illustrates a portion of a Harley-Davidson motorcycle 10 which would normally be a pre-1982 XL model or a pre-1969 FL model. On both types of motorcycles, an engine 12 is provided which not only powers the motorcycle, but which also drives a conventional generator (not shown) which was mounted on the mounting plate or support plate 14 by means of mounting bolts 16 and 18 adapted to be extended through openings 20 and 22, respectively. Mounting or support plate 14 includes an opening 24 through which the rotor shaft of the generator normally extends. Motorcycle 10 includes a drive gear 25 positioned in the interior of mounting plate 14 driving the rotor shaft of the motorcycle generator. Such generators required frequent replacement and were not efficient. It is for those reasons that it highly desirable to be able to convert a motorcycle from a generator-type motorcycle to an alternator-type motorcycle.

Figure 2:
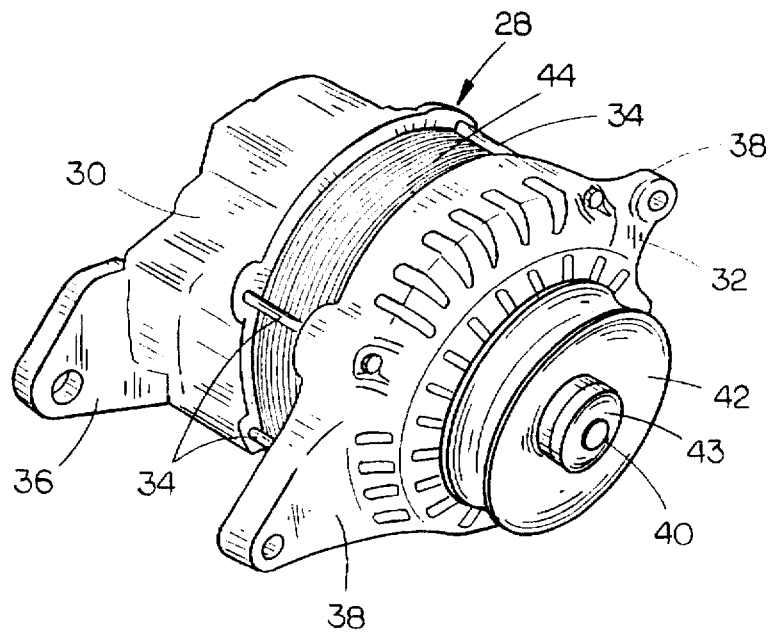
FIG. 2 is a perspective view of the alternator prior to any modification thereof.
Figure 3:
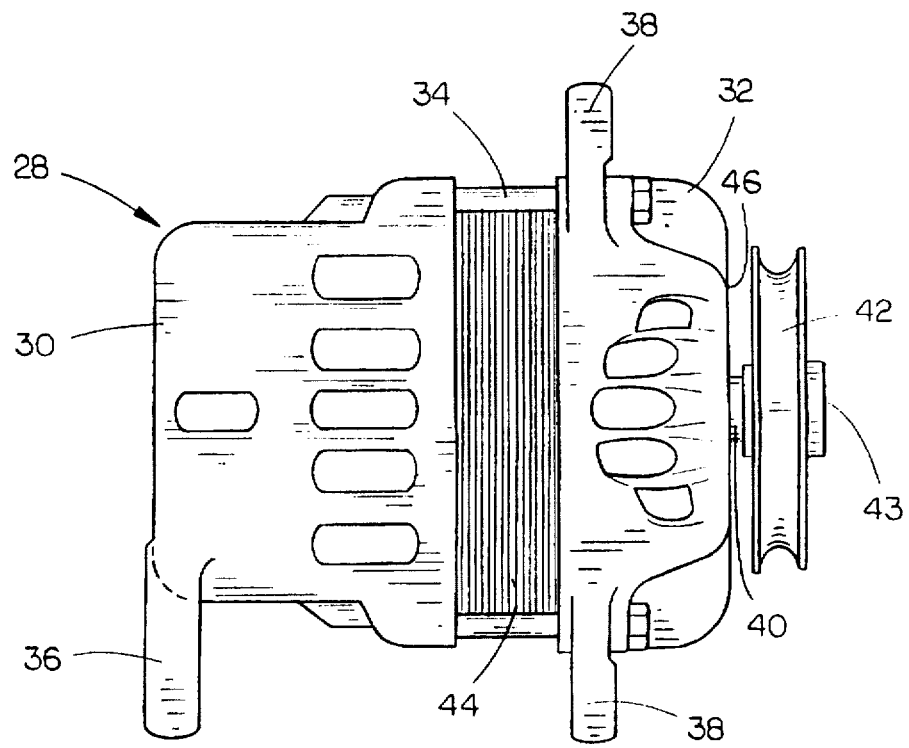
FIG. 3 is a plan view of the alternator of FIG. 2 or a modification thereof.
Figure 4:
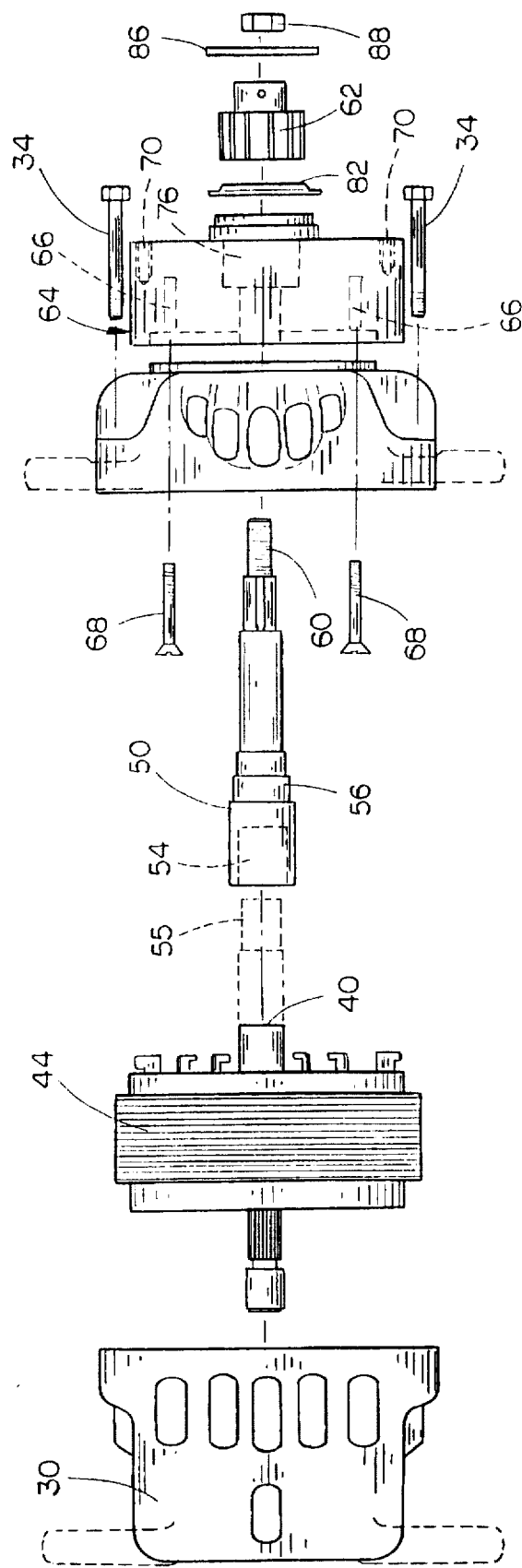
FIG. 4 is an exploded perspective view of the modified alternator.
Figure 5:
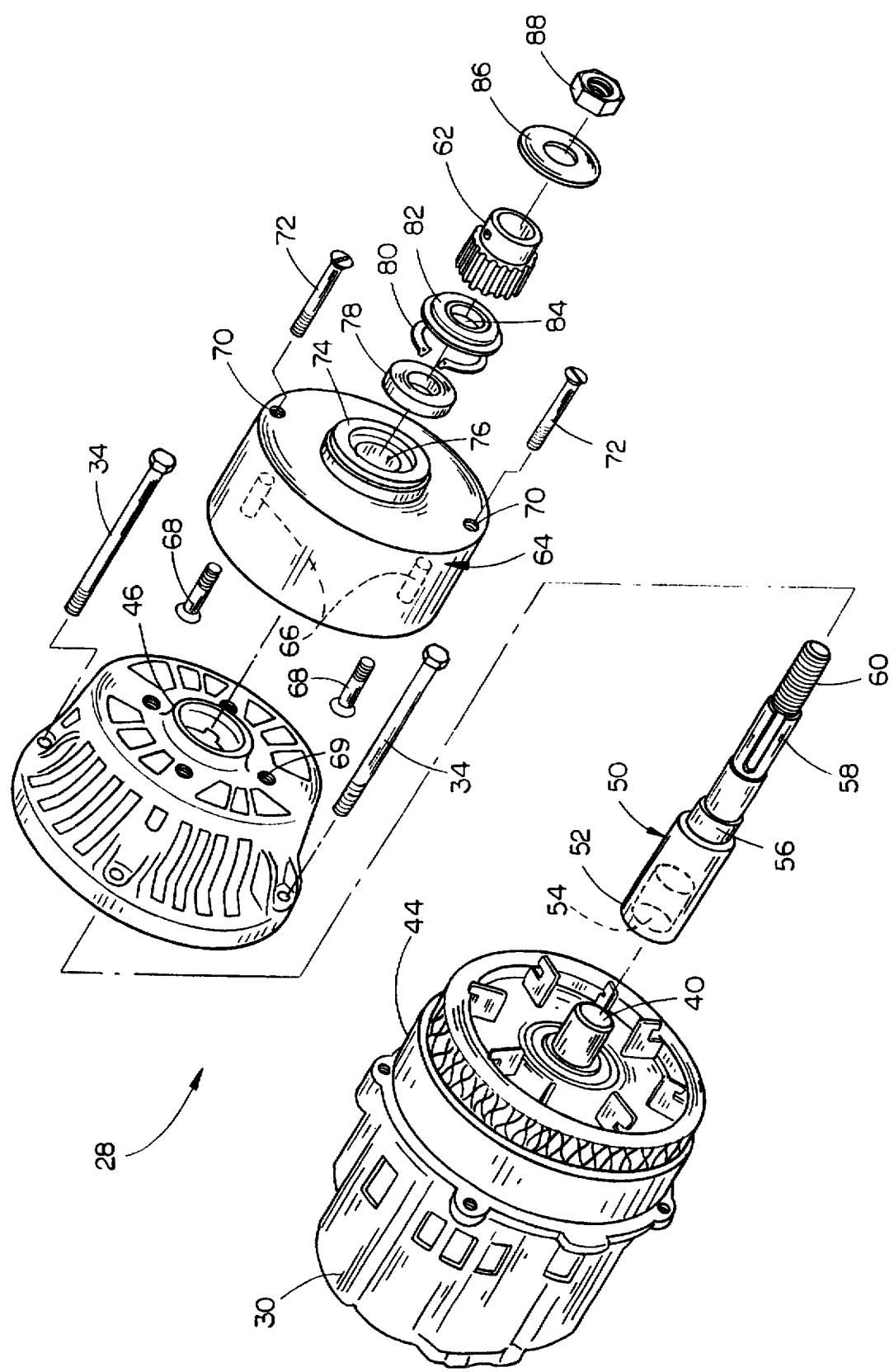
FIG. 5 is an exploded perspective view of the modified alternator.
Figure 6:
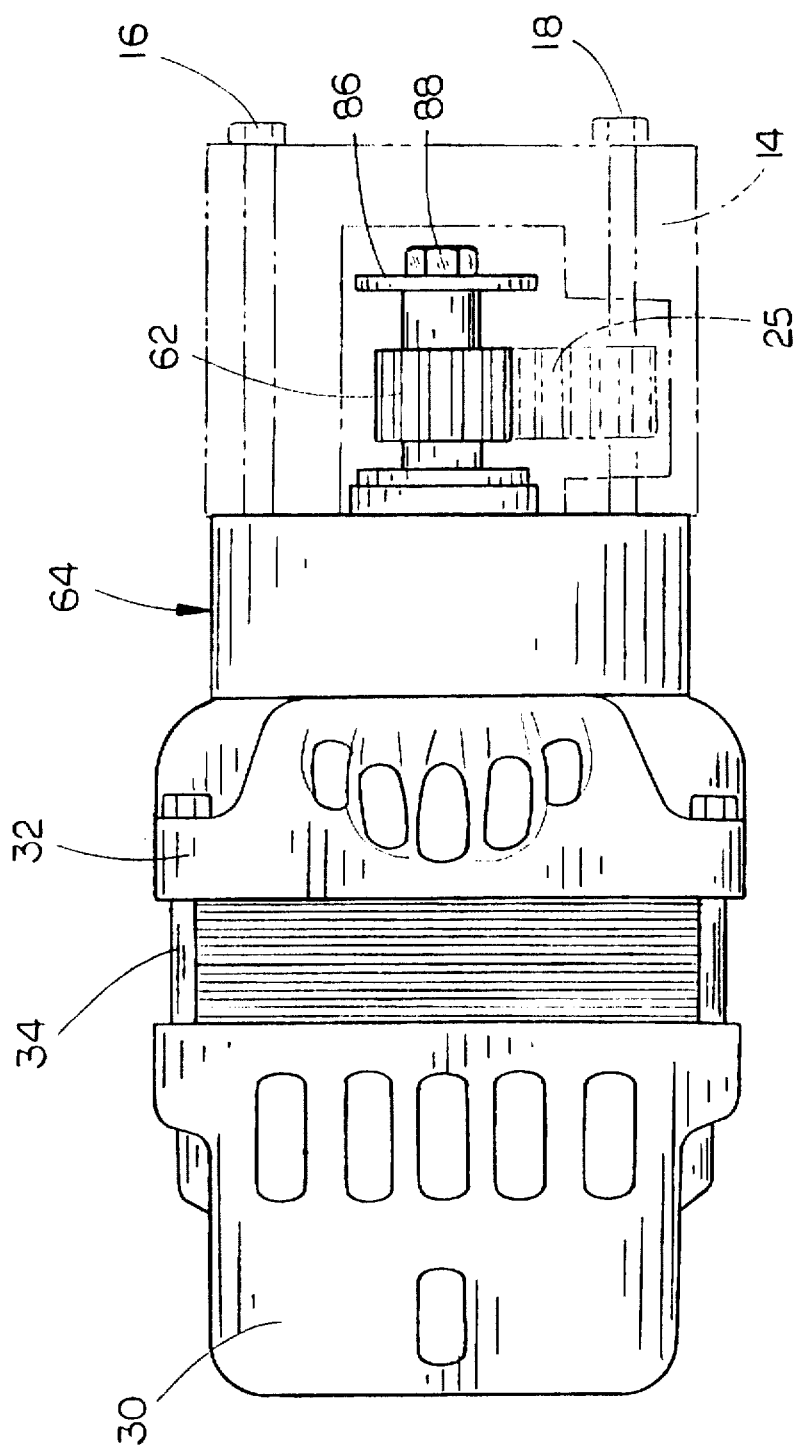
FIG. 6 is an elevational view illustrating the modified alternator mounted on the motorcycle in place of the conventional generator.

The modified automotive alternator of this invention is designed to replace the conventional motorcycle generator, as will be described hereinafter, after the alternator has been modified. FIGS. 2 and 3 illustrate a conventional belt-driven automotive alternator which is modified to be mounted on the motorcycle 10. The alternator 28 includes a tail housing 30 and a nose housing 32 which are bolted together by a plurality of bolts 34. In most cases, the tail housing 30 of alternator 28 will include one or more mounting dogs 36. Similarly, in most cases, nose housing 32 will also include one or more mounting dogs 38. Alternator 28 also includes a rotor shaft 40 which extends through nose housing 32 and which has a belt pulley 42 mounted thereon and maintained thereon by nut 43. Alternator 28 also includes a conventional stator 44. Further, the rotor shaft 40 is supported by a bearing (not shown) mounted in nose housing 32.

Alternator 28 is modified as follows to permit its replacement for the conventional generator on the motorcycle 10. The mounting dogs 36 and 38 are removed from housings 30 and 32 by grinding, cutting, etc. Nut 43 is removed from shaft 40 to permit pulley 42 to be removed from shaft 40. Pulley 42 and nut 43 are then discarded. If spacers are mounted on the shaft 40, as is usually the case, those spacers are removed and discarded. Nose housing 32 is then removed from the alternator 28 by removing the bolts 34. The shaft bearing on the inside of the nose housing is then removed and discarded. The exterior surface 46 of nose housing 32 is then machined smooth to accept the adapter plate 64 as will be described hereinafter.

The rotor shaft 40, exposed by the removal of nose housing 32, is then cut back, usually about one inch, to remove the threaded portion of the shaft 40. An adapter shaft 50 is then press-fitted onto the stub of the shaft 40. Adapter shaft 50 includes a cylindrical portion 52 at its inner end which has a cavity or recess 54 formed therein adapted to receive the stub of shaft 40. Adapter shaft 50 also includes a bearing surface 56, a four-way key way 58 and a threaded outer end 60. Key way 58 is adapted to receive the gear wheel 62 which was removed from the old generator being replaced. If nose housing 32 does not have openings formed therein, openings 69 are created therein to enable the bolts or screws 68 to be extended therethrough. Adapter plate 64 is then positioned adjacent the exterior surface of nose housing 32. Adapter plate 64 is cylindrical in shape, as seen in the drawings, and has its inner end machined to fit the machined outer end of nose housing 32. Adapter plate 64 also has a plurality of threaded bores 66 formed in its rearward end adapted to receive the threaded ends of mounting bolts 68 which extend outwardly through the openings 69 formed in nose housing 32 to mount adapter plate 64 on the alternator. Nose housing 32 is then reassembled to the alternator.

The outer end of adapter plate 64 is also provided with a pair of internally threaded bores 70 adapted to receive the mounting bolts 16 and 18 which originally secured the generator to the motorcycle 10. The outer end of adapter plate 64 is provided with a hub portion 74 having a central opening 76 formed therein adapted to receive a double-sealed bearing and bearing snap ring 80. Preferably, an oil slinger 82 is positioned adjacent the outer end of hub portion 74 and has an opening 84 formed therein through which adapter shaft 50 extends. Gear wheel 62 is then mounted on the adapter shaft 50. Gear wheel 62 is maintained on adapter shaft 50 by washer 68 and hex nut 88.

The modified alternator is then secured to the motorcycle 10 by inserting the gear wheel 62 into the opening 24 so that the teeth of the gear wheel 62 mesh with the drive gear 25 located therein. Mounting bolts 16 and 18 are then extended through the openings 20 in the support plate 14 and are threadably received by the opening 70 of adapter plate 64 to secure the alternator 28 on the motorcycle 10. Power lead 90 is then extended from the alternator 28 to the battery 92. Lead 94 connects battery 92 to switch 96. Lead 98 extends from switch 96 to coil 100. The numeral 102 refers to a plurality of leads or wires extending from switch 96 for connection to various accessories on the motorcycle 10.

Thus it can be seen that a novel method has been provided for converting or modifying a conventional automotive alternator so that it may replace the generator on a motorcycle. The modified alternator is much more durable than the conventional generator and is much more efficient. Further, the alternator does not require a voltage regulator normally associated with a generator, since the alternator has a built-in regulator. Not only is the alternator more durable, but it is more efficient, since it has the ability to produce greater current values than the conventional generator.

Once the alternator has been modified, it may be sold as a part of a kit so that the owner of a motorcycle having a generator thereon may quickly and easily replace that generator with an alternator.

Thus it can be seen that the invention accomplishes at least all of its stated objectives.

We claim:

1. The method of modifying an alternator to enable the modified alternator to replace the generator on a motorcycle, said alternator including a tail housing having inner and outer ends, a nose housing having inner and outer ends, bolts removably securing said tail and nose housings together, a stator, a rotor rotatably mounted in said stator, a rotor shaft secured to said rotor which rotatably extends through said nose housing, a pulley mounted on said rotor shaft outwardly of said nose housing, at least one of said tail and nose housings having at least one mounting or tensioning lug extending therefrom, (a) removing the dog or dogs from said nose housing or tail housing;
   (b) removing the pulley from said rotor shaft;
   (c) removing said nose housing from said tail housing;
   (d) shortening said rotor shaft by cutting a portion therefrom to create a rotor shaft stub;
   (e) providing an elongated shaft adapter having inner and outer ends, said shaft adapter having a hollow cylindrical portion at its inner end and a threaded portion at its outer end;
   (f) fitting said hollow cylindrical portion onto said rotor shaft stub so that said rotor shaft stub will rotate with said adapter shaft;
   (g) securing said nose housing to said tail housing;
   (h) providing a hollow cylindrical adapter plate having inner and outer ends;
   (i) securing said adapter plate to the outer end of said nose housing so that its inner end is positioned adjacent the outer end of said nose housing;
   (j) providing a gear wheel; and
   (k) mounting said gear wheel on said adapter shaft for rotation therewith.

2. The method of claim 1 wherein the outer end of the nose housing is machined smooth prior to said adapter plate being mounted thereon.

3. The method of claim 1 wherein said nose housing includes a first shaft bearing which rotatably receives said rotor shaft and wherein said first shaft bearing is removed from said nose housing after said nose housing is removed from said tail housing.

4. The method of claim 3 wherein a second shaft bearing is mounted on said adapter plate prior to said adapter plate being secured to said nose housing.

5. The method of claim 1 wherein a nut is threaded onto said threaded portion of said adapter shaft to maintain said gear wheel thereon.

6. The method of claim 1 wherein the alternator, after steps (a) through (k), is then mounted on the motorcycle where the generator was once mounted.

7. The method of claim 1 wherein said adapter shaft is attached to said rotor shaft stub.

8. The method of claim 1 wherein said adapter plate is bolted onto said nose housing.

9. The method of claim 1 wherein said gear wheel comprises the gear wheel of the generator to be replaced.

10. The method of claim 1 wherein an oil seal and a bearing are mounted on said adapter plate for embracing engagement with said adapter shaft extending therethrough.

* * * * *